June 14, 1960 W. A. OSWALD 2,940,208
FISHING DEVICE
Filed April 4, 1958
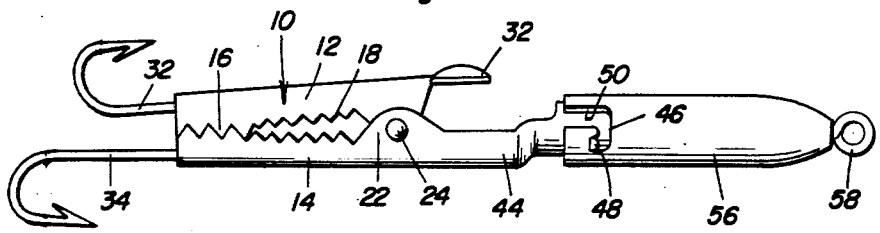
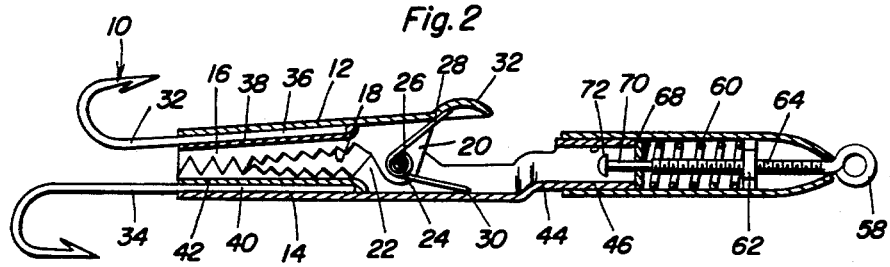
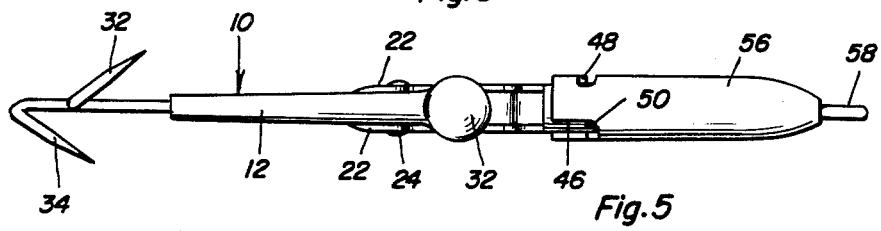
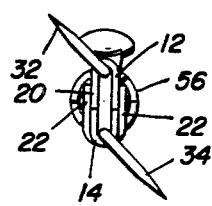
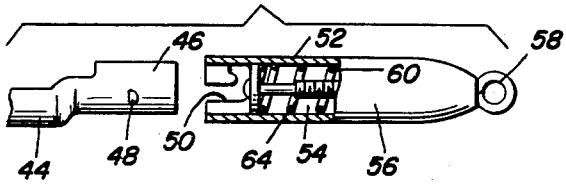
Walter A. Oswald
INVENTOR.

United States Patent Office 2,940,208
Patented June 14, 1960

2,940,208
FISHING DEVICE
Walter A. Oswald, 13500 S. Lavergne Ave.,
Blue Island, Ill.
Filed Apr. 4, 1958, Ser. No. 726,567
5 Claims. (Cl. 43—44.6)

This invention relates to anglers' equipment and more particularly to an easily baited fish hook.

An object of the invention is to provide an easily baited, quick-release fish hook that will facilitate the attaching of bait in the proper position with respect to the fish hook or hooks and that will also facilitate the rapid and easy separation of the fish hook from the leader in order to replace the fish hook with a different one.

A more particular object of the invention is to provide a fishing device which includes a pair of jaws that are spring pressed to the jaw closed position and between which confronting teeth are adapted to engage the fish bait, there being one or more hooks carried by the jaws so that the bait is adjacent to the hook whereby when the fish strike or bite for the bait, they are hooked.

A further specific object of the invention is to provide a novel quick-release mechanism by which the jaw structure is separably attached to a fishing leader. In this way there is no difficulty encountered in quickly releasing the fish hook from the leader and there is equally little difficulty in attaching another fishing device to the same leader.

A further object of the invention is to provide a practical device which will satisfy a long standing need in the sport of fishing yet, can be manufactured quite inexpensively.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side view of a fishing device constructed in accordance with the invention.

Figure 2 is a longitudinal sectional view of the device in Figure 1.

Figure 3 is a top view of the device in Figure 1.

Figure 4 is an end view of the device in Figure 1.

Figure 5 is an exploded fragmentary elevational view showing the jaw structure separated from the quick-release mechanism portion that is attached to the fishing leader, parts of this shown in section.

In the accompanying drawing there is a fishing device 10 constructed in accordance with the invention. This device is composed of a pair of jaws 12 and 14 that are preferably made of lightweight sheet metal or thin wall plastic. They resemble an alligator clip but have comparatively large teeth 16 at the outer ends of the jaws and comparatively shorter teeth 18 at the inner part of the jaws and forming a pocket within which to accommodate fish bait. The large teeth 16 engage with each other when the jaws are fully closed and there is a space between the smaller teeth 18 (Figure 1) and this space constitutes the pocket for the fish bait.

When thin walled metal is used for the jaw structure, it will be curved in cross-section for strength and rigidity. A pair of depending ears 20 are at the inner end of jaw 12 and there are corresponding pair of ears 22 at an intermediate part of the longer jaw 14. Pivot pin 24 is passed through aligned openings in the ears 20 and 22 and is swedged, peened or otherwise held in place. Coil spring 26 is disposed on pivot pin 24 and has its ends 28 and 30 seated on both jaws 12 and 14 thereby providing reaction points for the spring. The bias of the spring is in a direction tending to keep the jaws in the closed position at all times. They can be manually separated by depressing the finger grip 32 on jaw 12 and at the same time holding the other jaw 14. When opened, the bait is easily inserted between the jaws. Then the jaws can be released permitting the spring 26 to exert a force on the jaws clamping them closed against the bait.

The illustrated embodiment has two hooks 32 and 34, although a smaller or larger number of hooks can be used. Hook 32 has its shank 36 in a passageway formed by having a small width plate 38 secured to the inside surface of the transversely curved jaw. The fish hook shank can be soldered, held by rivets or otherwise fastened in place. Hook 34 has its shank 40 in a similar passage formed by a small width transverse plate 42 that extends across and is secured to the opposing walls of the transversely curved jaw 14. The fish hooks protrude from the ends of the jaws and one hook is slightly longer than the other.

Jaw 14 has an extension or extended part 44 at its inner end terminating in an elongate tubular member 46. There is a slight offset in the extended part 44 so that the center line of member 46 is approximately coextensive with the center line of the jaws when they are in their closed or opened positions.

There are means for quickly, releasably attaching the jaw structure to a fishing leader (unshown), and these means include a pair of projections 48 extending from the outside surface of the side wall of member 46. They are adapted to be inserted in a pair of bayonet slots 50 formed in the side wall 52 of socket 54. The socket is constructed of a bore of a tube 56 having an opening at one end through which a bolt 64 is passed, and the bolt has an eye 58 to which a fishing leader is adapted to be secured. Spring 60 is seated in the socket with one end disposed on nut 62 located in the socket. The nut is threaded on the shank of screw 64 to the outer end of which eye 58 is fixed. The nut is fixed against rotation in the tapered end of socket 54, and bolt 64 is fixed against longitudinal movement by eye 58 abutting the tapered end of the socket. The opposite end of spring 60 is disposed and seated on a plate 68 of a size to slide axially in the socket. The inner extremity of screw 64 has a reduced shank 70 with a head 72 thereon. The plate 68 slides on the reduced extension 70 and is limited in its travel by head 72 and the shoulder which separates the reduced extension 70 from the main shank of screw 64.

Plate 68 is a reaction plate in that it is adapted to be abutted by the end of member 46 when the sleeve is inserted in socket 54. Accordingly, spring 60 opposes the inward movement of the member 46, and the force with which this opposition is set up can be adjusted by rotating eye 58, thus positioning nut 62 at selected places along the length of the socket. When the member 46 is inserted in a socket, it is pushed in as far as it will go and then rotated a quarter of a turn. This will engage the projections 48 in the lands of the bayonet slots 50 and they will be held there by the force of spring 60. To release the fishing device this procedure is reversed.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A fishing device comprising a pair of elongate jaws, a pivot connecting said jaws together for opening and closing movement, said jaws having means on confronting faces thereof for gripping and holding bait, at least one fish hook attached to one of said jaws and protruding therefrom adjacent to said means for holding said bait, a spring reacting on said jaws and opposing the movement of said jaws in a direction which opens said jaws and yieldingly retaining said jaws in the closed, bait clamping position, means for attaching said jaws to a fishing leader including a socket having a side wall and an open end and a leader receiving eye at the opposite end, said side wall provided with a locking slot, an elongate member secured to one of said jaws and adapted to fit into the open end of said socket, a projection on said member and engageable with said slot to hold said member and socket separably locked together, and resilient means in said socket and reacting on the end of said member which is in said socket to bias said member in a direction to maintain said projection engaged in said slot.

2. The fishing device of claim 1 wherein said means on confronting faces of said jaws for gripping and holding bait include rows of teeth on said jaws, said rows of teeth having teeth at the outer end of said jaws and teeth spaced inwardly therefrom, the inward teeth of one jaw spaced from the inward teeth of the other jaw when said jaws are in the closed position, thereby forming a bait pocket within which to accommodate the bait.

3. The fishing device of claim 2 wherein said resilient means include a spring, a bolt locked against longitudinal movement and located in said socket, a nut fixed against rotation with respect to said socket, said nut engaged with said bolt and constituting a seat for one end of said spring, said eye attached to said bolt and located on the exterior of said socket, said bolt engaged with said nut whereby upon rotation of said eye the length of said bolt to one side of said nut is adjusted, thereby adjusting the location of said spring in said socket and the compressive force applied onto the spring when said elongate member is inserted in the open end of said socket.

4. The fishing device of claim 3 wherein there is a washer on a part of said bolt and having the opposite end of said spring seated thereon, said washer constituting a stop against which the said inner end of said elongate member bears when inserted in said socket.

5. The fishing device of claim 4 wherein said locking slot is a bayonet slot.

References Cited in the file of this patent

UNITED STATES PATENTS

| 1,199,690 | Gillan | Sept. 26, 1916 |
| 1,324,109 | Dutes | Dec. 9, 1919 |
| 2,215,772 | Vecchia | Sept. 24, 1940 |
| 2,754,613 | Rogers et al. | July 17, 1956 |

FOREIGN PATENTS

| 656 | Great Britain | 1900 |